(12) United States Patent
Watabe

(10) Patent No.: US 11,973,915 B2
(45) Date of Patent: Apr. 30, 2024

(54) IMAGE PROCESSING APPARATUS AND IMAGE PROCESSING METHOD FOR DETERMINING DATA OUTPUT BASED ON PROMPTS

(71) Applicant: SHARP KABUSHIKI KAISHA, Sakai (JP)

(72) Inventor: Tatsuya Watabe, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/120,942

(22) Filed: Mar. 13, 2023

(65) Prior Publication Data

US 2023/0300277 A1 Sep. 21, 2023

(30) Foreign Application Priority Data

Mar. 16, 2022 (JP) .................................. 2022-041661

(51) Int. Cl.
*H04N 1/44* (2006.01)
*H04N 1/00* (2006.01)

(52) U.S. Cl.
CPC ......... *H04N 1/444* (2013.01); *H04N 1/00244* (2013.01); *H04N 1/4413* (2013.01); *H04N 1/4453* (2013.01); *H04N 2201/0094* (2013.01)

(58) Field of Classification Search
CPC .. H04N 1/444; H04N 1/00244; H04N 1/4413; H04N 1/4453; H04N 2201/0094
See application file for complete search history.

(56) References Cited

U.S. PATENT DOCUMENTS

| 2014/0068719 | A1* | 3/2014 | Kiukkonen | ........... H04W 12/50 726/4 |
| 2014/0112551 | A1* | 4/2014 | Terwilliger | .......... G06K 7/0004 235/375 |
| 2014/0355039 | A1* | 12/2014 | Tsujimoto | ............. G06F 3/1222 358/1.14 |
| 2021/0006670 | A1* | 1/2021 | Hase | .................. H04N 1/00331 |

FOREIGN PATENT DOCUMENTS

JP 2021-009625 A 1/2021

\* cited by examiner

*Primary Examiner* — Nicholas Pachol
(74) *Attorney, Agent, or Firm* — ScienBiziP, P.C.

(57) ABSTRACT

Identification information corresponding to a network resource is extracted from input document data. It is determined whether access to the network resource is appropriate based on the identification information. Based on a result of determination, the output of the document data is restricted, or at least part of the identification information is changed, and the document data is output.

9 Claims, 17 Drawing Sheets

FIG. 4
61
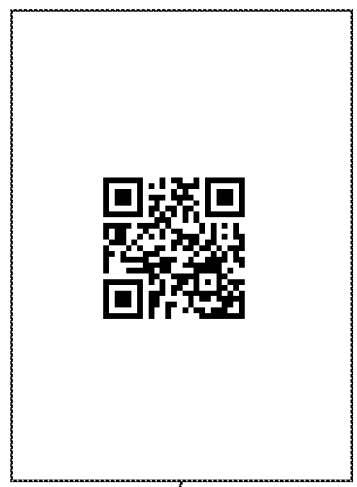
63
65

FIG. 7
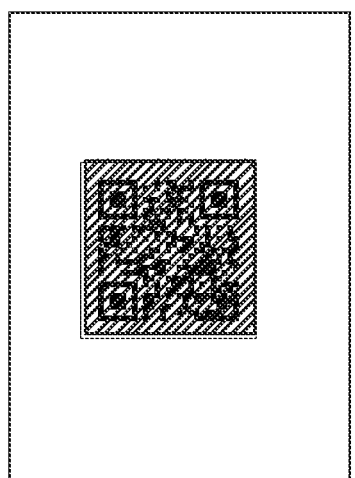
91
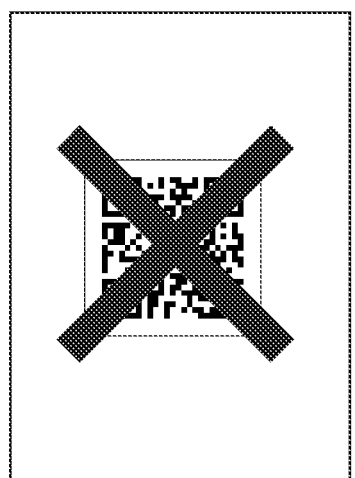
93
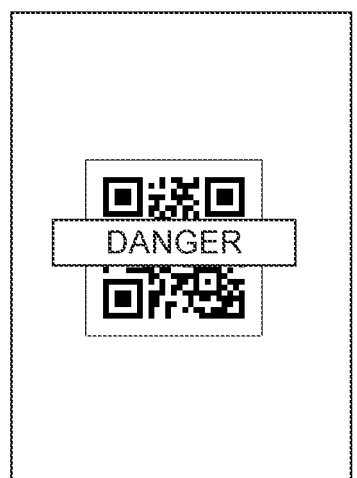
95
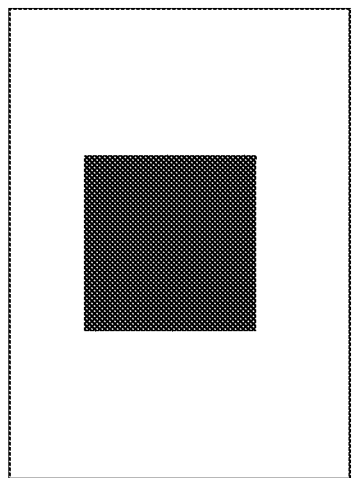
97
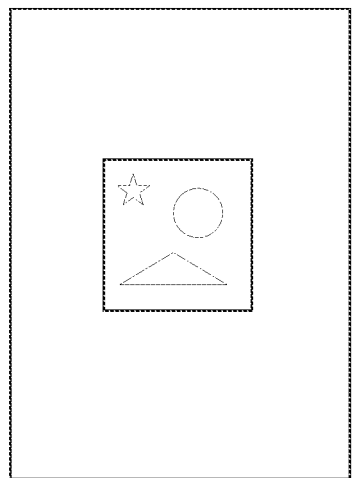
101
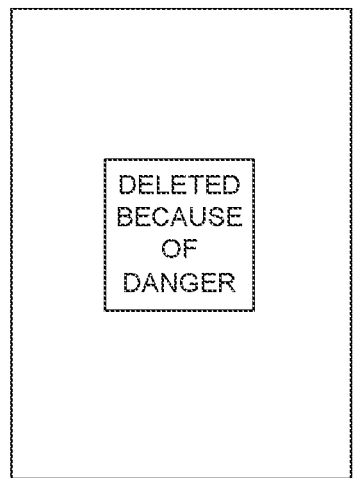
103

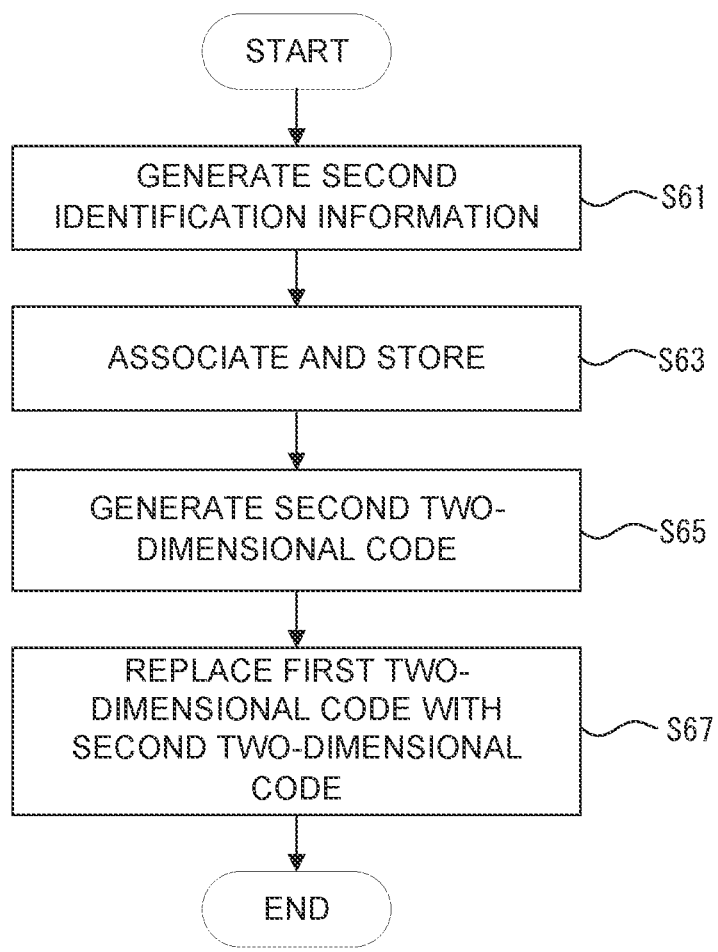

| SPECIFIC CODE | FIRST IDENTIFICATION INFORMATION | SECOND IDENTIFICATION INFORMATION |
|---|---|---|
| 0001 | www.virus-infected.com | www.multifunctionprinter.com/0001 |
| 0002 | www.hackedserver.com | www.multifunctionprinter.com/0002 |
| 0003 | www.virus-infected.com | www.multifunctionprinter.com/0003 |
| 0004 | www.virus-infected.com | www.multifunctionprinter.com/0004 |
| 0005 | www.hacked-server.com | www.multifunctionprinter.com/0005 |
| ... | ... | ... |

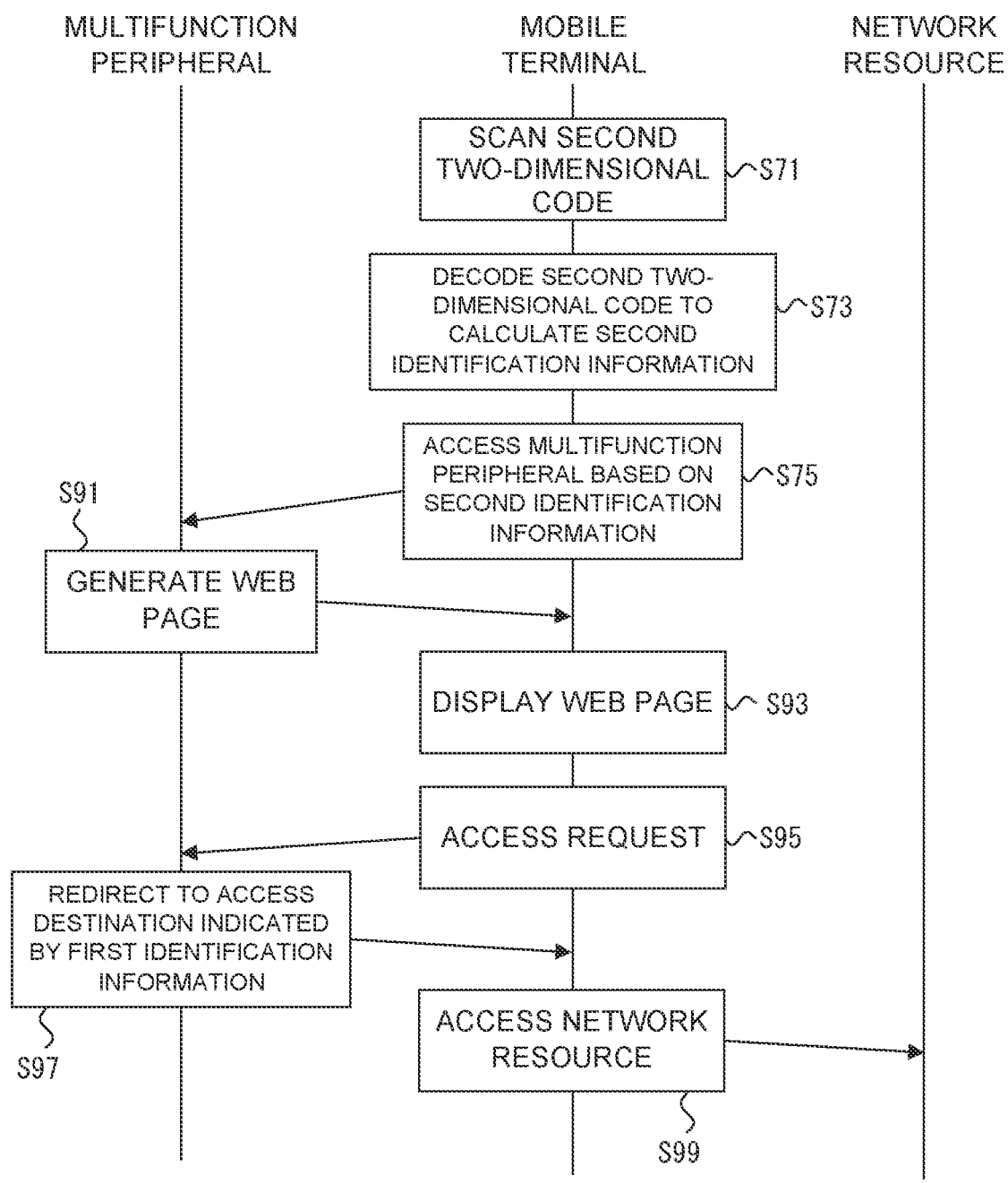

IMAGE PROCESSING APPARATUS AND IMAGE PROCESSING METHOD FOR DETERMINING DATA OUTPUT BASED ON PROMPTS

BACKGROUND OF THE INVENTION

Field of the Invention

The present disclosure relates to an image processing apparatus, and the like.

Description of the Background Art

There are conventional technologies that facilitate access to a network resource by mechanically reading a two-dimensional code indicating a Uniform Resource Locator (URL) of the network resource by using a camera of a mobile terminal such as a smartphone.

According to a conventional technology, which is a related technology, there is a known information processing apparatus that, when input image data includes link information, determines the danger of the access destination indicated by the link information based on a blacklist or virus definition data. When it is determined that the access destination is dangerous, the information processing apparatus notifies the user of that fact. According to the conventional technology, there is a known information processing apparatus that deletes the link information indicating the access destination, which is determined to be dangerous, from the input image data.

With the former information processing apparatus according to the conventional technology, when it is determined that the access destination indicated by the link information is dangerous, the original image data is output while the user is notified of that fact. The image data includes the dangerous link information as it is. Therefore, a person who sees the output image or printed material may access the dangerous access destination based on the link information due to carelessness or erroneous operation.

With the latter information processing apparatus according to the conventional technology, when it is determined that the access destination indicated by the link information is dangerous, the link information is deleted from the original image data for output. In this case, as the output image or printed material does not include the link information, there is no possibility that a person who sees the output accesses the dangerous access destination. However, as the link information is excluded from the output, the person who sees the output does not know that the original image data includes the link information.

The purpose of the present disclosure is to provide an image processing apparatus, and the like, which prevents access to dangerous network resources in a preferred manner.

SUMMARY OF THE INVENTION

An image processing apparatus according to the present disclosure includes an extractor that extracts identification information corresponding to a network resource from input document data, a determiner that makes a determination as to whether access to the network resource is appropriate based on the identification information, and an outputter that, based on a result of the determination, restricts output of the document data or changes at least part of the identification information and outputs the document data.

An image processing method according to the present disclosure includes extracting identification information corresponding to a network resource from input document data, making a determination as to whether access to the network resource is appropriate based on the identification information, and based on a result of the determination, restricting output of the document data or changing at least part of the identification information and outputting the document data.

According to the present disclosure, an image processing apparatus, and the like, are provided to prevent access to dangerous network resources in a preferred manner.

BRIEF DESCRIPTION OF THE DRAWINGS

FIG. 4 is a diagram illustrating an example of document data according to the first embodiment.

FIG. 7 is a diagram illustrating examples of an output image according to the second embodiment.

FIG. 12 is a diagram illustrating an output change process of the multifunction peripheral according to the third embodiment.

FIG. 13 is a diagram illustrating an example of a table stored by the multifunction peripheral according to the third embodiment.

FIG. 17 is a diagram illustrating an operation of the multifunctional peripheral and a mobile terminal according to the modification of the third embodiment.

DESCRIPTION OF THE PREFERRED EMBODIMENTS

Embodiments for implementing the present disclosure will be described below with reference to the drawings. The embodiments and modification below are examples for illustrating the present disclosure, and the technical scope of the present disclosure described in the claims is not limited to the description below.

1. First Embodiment

1.1 Overall Configuration

Figure 1:
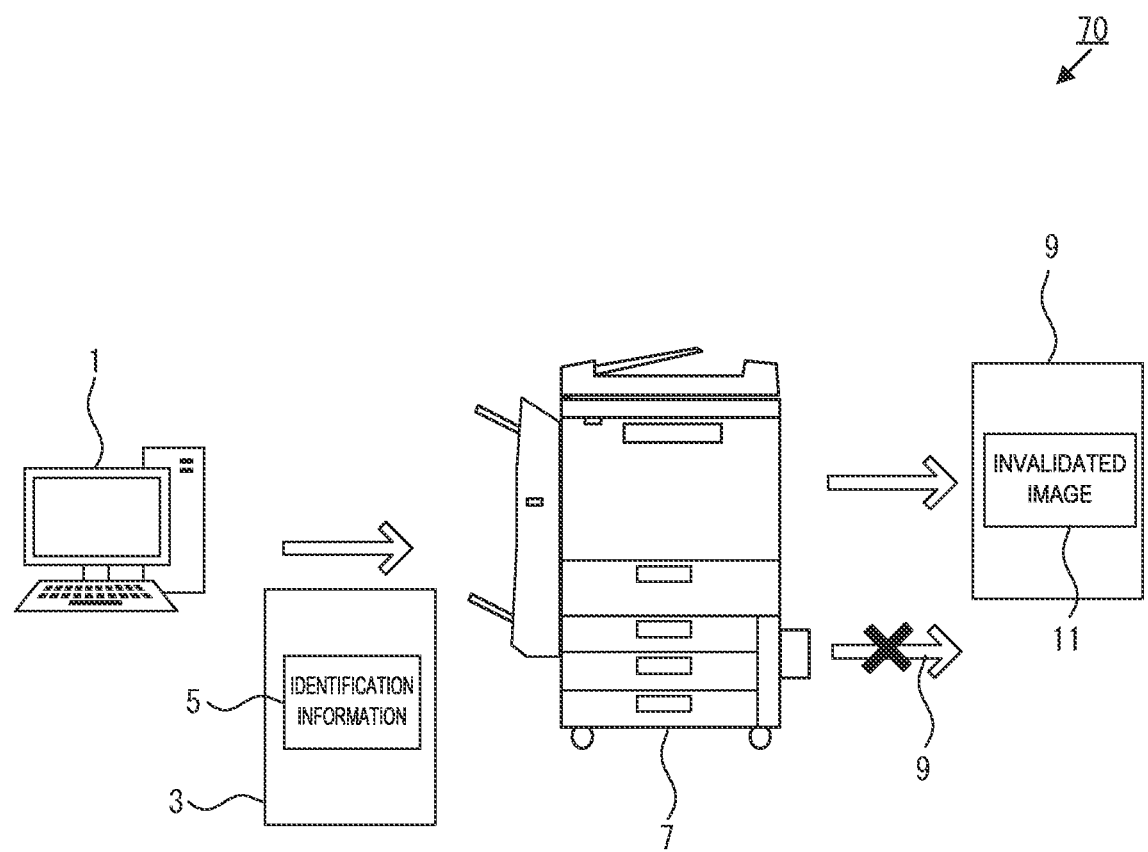
FIG. 1 is a diagram illustrating an entire system according to a first embodiment.

FIG. 1 is a diagram schematically illustrating a first embodiment of the present disclosure. A system 70 includes an input terminal 1 and a multifunction peripheral 7. The input terminal 1 is a terminal device that inputs document data 3 to the multifunction peripheral 7. The input terminal 1 is an information processing apparatus such as a personal computer or workstation. The input terminal 1 may be a mobile information terminal such as a tablet or smartphone.

The input terminal 1 and the multifunction peripheral 7 are configured such that the document data 3 may be provided from the input terminal 1 to the multifunction peripheral 7 in some form. For example, when the input terminal 1 and the multifunction peripheral 7 are connected to the identical local area network (LAN), the document data 3 may be sent from the input terminal 1 to the multifunction peripheral 7 by data communication via the LAN. Alternatively, the input terminal 1 and the multifunction peripheral 7 may be connected via a Universal Serial Bus (USB) cable, and the document data 3 may be sent directly from the input terminal 1 to the multifunction peripheral 7. Alternatively, the document data 3 may be stored in a removable external storage device such as a USB memory in the input terminal 1 and, after the external storage device is removed from the input terminal 1, the external storage device may be connected to the multifunction peripheral 7 so that the multifunction peripheral 7 may read the document data 3 from the external storage device.

The document data 3 is data that is output to a screen of a display device or a print medium for a printer. The document data 3 includes identification information 5. The identification information 5 is information designating a network resource. Examples of the identification information include a Uniform Resource Locator (URL), Internet Protocol (IP) address, root certificate issued by a certification authority, which issues digital certificates, to prove its legitimacy, and configuration profile that specifies an access point, etc., used by a mobile terminal to connect to the Internet via a mobile data communication network. The document data 3 and the identification information 5 in the figure are schematically illustrated as displayed on a display device or printed on a print medium.

The identification information 5 is included in the document data 3 as any or a combination of character, image, bar code, and two-dimensional code. Characters may be included in the document data 3 as character codes or as images representing character shapes. The type of two-dimensional codes may be a stack type, such as a Portable Data File (PDF) or a CODE, or a matrix type, such as QR code (registered trademark) or data matrix.

The multifunction peripheral 7 is one type of image processing apparatus and is a multifunction peripheral having multiple functions, i.e., copier function, facsimile function, printer function, and scanner function. The multifunction peripheral 7 preferably further has other functions, such as a web server function to publish web pages on the network or an Internet fax function to exchange information via e-mails.

In some cases, the multifunction peripheral 7 provides output 9 based on the document data 3, but in other cases, the multifunction peripheral 7 does not provide the output 9. The output 9 is output of the document data 3 printed on a print medium or displayed on a display device. The output 9 includes an invalidated image 11. The invalidated image 11 is information in which the identification information 5, which is information designating a network resource, is invalid.

The network resource is a resource that is connected to the network and is available via the network. The resources may be hardware or software. Examples of the hardware include server devices, shared storage, network printers, and network scanners. Server devices are devices that operate various servers, such as file servers, web servers, and database servers. Examples of the software includes various server programs, such as file servers, web servers, and database servers. The network resource is accessible from a mobile terminal. As described above, the network resource is designated with the identification information 5. For example, when the network resource is a specific web page, the identification information is a URL or IP address.

1.2 Configuration of Multifunction Peripheral 7

The multifunction peripheral 7 determines whether the document data 3 includes character information indicating a predetermined type of identification information. When the character information is included, the multifunction peripheral 7 further makes a determination as to whether access to the network resource corresponding to the identification information is appropriate. Based on a result of the determination, the multifunction peripheral 7 restricts the output of the document data 3. Here, the multifunction peripheral 7 makes a determination as to whether the access is appropriate when a URL is included as the identification information.

Figure 2:
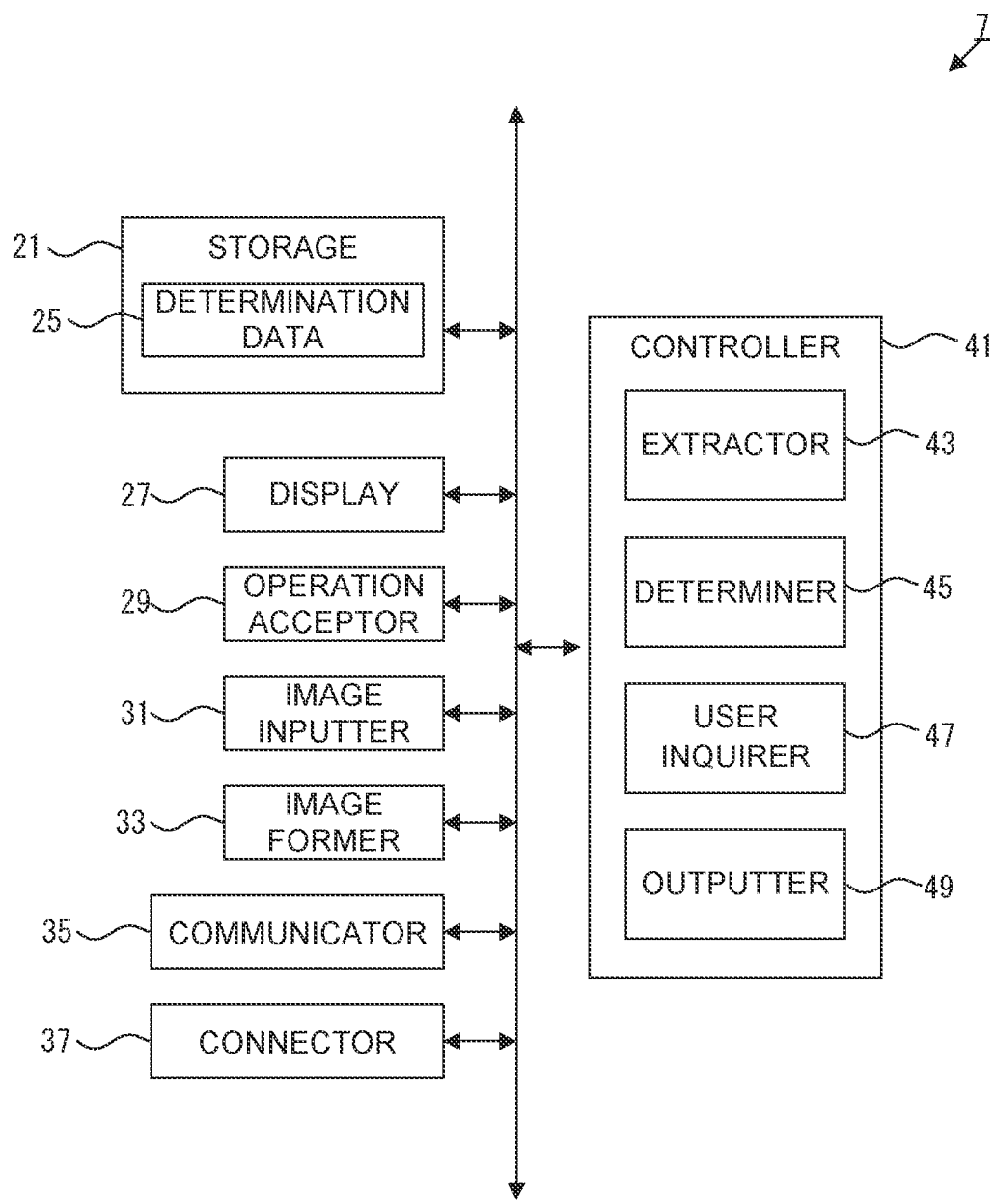
FIG. 2 is a diagram illustrating a functional configuration of a multifunction peripheral according to the first embodiment.

FIG. 2 is a diagram illustrating an example of a functional configuration of the multifunction peripheral 7. The multifunction peripheral 7 includes a storage 21, determination data 25, a display 27, an operation acceptor 29, an image inputter 31, an image former 33, a communicator 35, a connector 37, and a controller 41. The controller 41 includes an extractor 43, a determiner 45, a user inquirer 47, and an outputter 49.

The storage 21 is a functional unit that stores various programs and various types of data necessary for operations of the multifunction peripheral 7. The storage 21 includes a recording device capable of transitory storage, such as a dynamic random access memory (DRAM), or a non-transitory recording device, such as a solid state drive (SSD) including a semiconductor memory or a hard disk drive (HDD) including a magnetic disc. Although the one storage 21 is used for convenience of explanation, the storage 21 may be configured as separate devices for purposes, such as an area (primary storage area) used for program execution, an area (auxiliary storage area) for storing programs and data, and an area used for caching.

The storage 21 stores the determination data 25. The determination data 25 is data used by the determiner 45 to make a determination as to whether the network resource corresponding to the identification information is appropriate for access. The determination data 25 may be a blacklist including URLs of known dangerous sites. The determination data 25 may also be a whitelist including URLs of previously confirmed safe sites. The determination data 25 may also be a virus pattern file that describes a specific character string or characteristic behavior pattern included in the virus.

The display 27 is a functional unit that displays images and characters. In particular, when the multifunction peripheral 7 outputs the document data 3 as an image, the display 27 displays the output 9. The display 27 includes, for example, a liquid crystal display (LCD) or an organic electro-luminescence (EL) panel. The display 27 may be a single display device or may further include an externally connected display device.

The operation acceptor 29 accepts the input of an operation from the user. For example, the operation acceptor 29 includes a hardware key or software key. The operation acceptor 29 includes, for example, a task key to execute tasks such as FAX transmission and image scan, and a cancel key to cancel an operation. The operation acceptor 29 may include physical operation keys such as a task key, a cancel key, a power key, and a power-saving key.

The image inputter 31 reads an image (document) and outputs the read image as image data. The image inputter 31 includes a typical scanner (image input device). The image inputter 31 may receive image data from an external storage medium such as a Universal Serial Bus (USB) memory or receive an image via a network.

The image former 33 includes a printing mechanism, such as an inkjet printer or laser printer, and uses the printing mechanism to form a print image based on the input data on a print medium such as paper. In particular, when the multifunction peripheral 7 prints out the document data 3, the image former 33 prints out the output 9 to a print medium.

The communicator 35 is a functional unit that connects to a network for data communication. The communicator 35 includes, for example, an interface that may be connected to a wired LAN, a wireless LAN, or an LTE network. The communicator 35 is connected to the network so that the multifunction peripheral 7 is connected to other devices and external networks.

The connector 37 establishes connection so that the multifunction peripheral 7 may communicate data with other devices. For example, the connector 37 is a USB interface, to which a USB memory, or the like, is connected. In addition, the connector 37 may include, for example, short-range wireless devices for Near Field Communication (NFC) and Bluetooth (registered trademark). The communicator 35 and the connector 37 may be configured as a single unit. For example, the communicator 35 and the connector 37 may be provided as a single wireless communication interface that may use wireless LAN or Bluetooth.

The controller 41 is a functional unit that controls the overall multifunction peripheral 7. The controller 41 includes one or more control devices or control circuitries and includes, for example, a central processing unit (CPU) or system on a chip (SoC). The controller 41 reads programs stored in the storage 21 and performs processes to function as the extractor 43, the determiner 45, the user inquirer 47, and the outputter 49.

The extractor 43 performs a process to extract the character information from the document data 3. The character information may be a character code included in the document data 3. The character information may also be the image representing the shape of the character included in the document data 3. The character information may also be included as a barcode or two-dimensional code in the document data 3. Furthermore, the character information may be a combination thereof.

The determiner 45 performs a process to determine whether the network resource indicated by the identification information 5 is safe based on the determination data 25. For example, when the determination data 25 is a blacklist, the determiner 45 determines whether the blacklist includes the network resource indicated by the identification information 5. When the blacklist includes the network resource, the determiner 45 determines that the network resource is dangerous. When the blacklist does not include the network resource, the determiner 45 determines that the network resource is safe. For example, when the determination data 25 is a whitelist, the determiner 45 determines whether the whitelist includes the network resource indicated by the identification information 5. When the whitelist includes the network resource, the determiner 45 determines that the network resource is safe. When the whitelist does not include the network resource, the determiner 45 determines that the network resource is dangerous. For example, when the determination data 25 is a virus pattern file, the determiner 45 accesses the network resource via the communicator 35 to receive the data. The determiner 45 determines whether the received data includes a virus based on the virus pattern file. When a virus is included, the determiner 45 determines that the network resource is dangerous. When no virus is included, the determiner 45 determines that the network resource is safe.

The user inquirer 47 displays a message via the display 27 to inquire the user as to whether the output is desired when the determiner 45 determines that the network resource indicated by the identification information 5 is dangerous. The user inquirer 47 receives the input regarding whether the output is desired via the operation acceptor 29.

The outputter 49 cancels the output of the document data 3 when the user inquirer 47 receives the input indicating no output from the operation acceptor 29. The outputter 49 displays a message on the display 27 to indicate that the output has been canceled because the network resource is dangerous.

1.3 Operation

Figure 3:
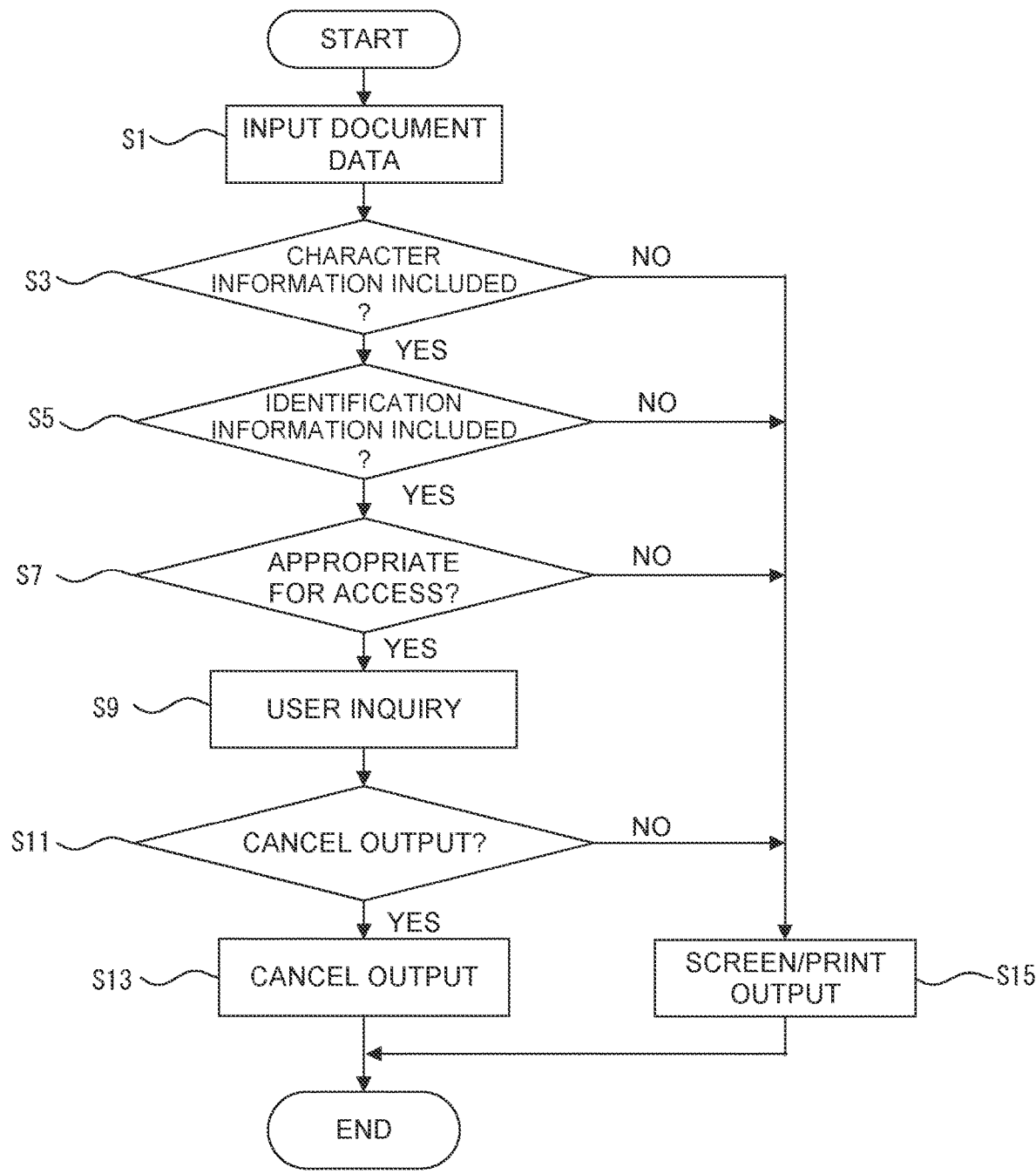
FIG. 3 is a diagram illustrating an operation of the multifunction peripheral according to the first embodiment.

FIG. 3 is a flowchart illustrating an operation of the system 70 according to the first embodiment. Here, it is assumed that the multifunction peripheral 7 extracts the URL as identification information from the document data 3.

The input terminal 1 inputs the document data 3 to the multifunction peripheral 7 (Step S1). The document data 3 includes the identification information 5 corresponding to the network resource. FIG. 4 illustrates document data 61, 63, and 65 as examples of the document data 3. In the figure, the document data 61, 63, and 65 are illustrated as print images when printed as they are. The document data 61, 63, and 65 all include the URL (www.example.com) of the network resource.

The document data 61 includes only characters as the identification information 5. Here, the characters may be included as a sequence of character codes or as the image representing the shape of the character string. The document data 63 includes only a two-dimensional code as the identification information 5. The document data 65 includes both characters and a two-dimensional code as the identification information 5. In the document data 63 and 65, QR codes are used as examples of the two-dimensional code.

When the communicator 35 receives the document data 3, the extractor 43 attempts to extract the character information from the document data 3 (Step S3). Here, the character information is information represented by a sequence of character codes. The extractor 43 generates a virtual print image from the document data 3 and performs a character recognition process similar to an optical character recognition (OCR) process on the print image to extract the character information. When the document data 3 includes a character code, the extractor 43 may extract the character code from the document data 3. The extractor 43 detects a two-dimensional code from the virtual print image and performs a process to decode the detected two-dimensional code to extract the character information as a decode result from the document data 3. When no character information is extracted from the document data 3 ("No" in Step S3), the process proceeds to Step S15 described below.

When the character information is extracted from the document data 3 ("Yes" in Step S3), the extractor 43 extracts the identification information from the character information (Step S5). Typically, URLs are written according to a format including a scheme name, host name, and a file name or a directory name in a file system of the host. The extractor 43 extracts a character string described according to the format of the URL as identification information from the extracted character information. A character string with a scheme name ("http://" or "https://") omitted may also be extracted as the identification information as in the document data 61, 63, and 65 illustrated in FIG. 4. When the extracted character information includes no identification information ("No" in Step S5), the process proceeds to Step S15 described below.

When the extractor 43 extracts the identification information ("Yes" in Step S5), the determiner 45 makes a determination as to whether the network resource corresponding to the identification information is appropriate for access (whether the access destination is dangerous) based on the determination data 25 previously stored in the storage 21 (Step S7). When the determiner 45 determines that the network resource is appropriate for access (the access destination is not dangerous) ("No" in Step S7), the process proceeds to Step S15 described below.

The method for making a determination as to whether the access is appropriate is as follows, for example. The storage 21 previously stores the blacklist including the URLs of known dangerous sites as the determination data 25. The determiner 45 compares the extracted URL with each of the URLs on the blacklist. When there is a matching URL, the determiner 45 determines that the access to the extracted URL is not appropriate. If there is no matching URL, the determiner 45 determines that the access to the extracted URL is appropriate.

Another method for making a determination as to whether the access is appropriate is as follows, for example. The determiner 45 uses the communicator 35 to access the network resource indicated by the extracted URL via the network and receives data from the network resource. The determiner 45 determines whether the received data includes a virus based on the virus pattern data stored as the determination data 25. When a virus is included, the determiner 45 determines that the access to the network resource is not appropriate. When no virus is included, the determiner 45 determines that the access to the network resource is appropriate. When it is determined that the access is appropriate ("No" in Step S7), the process proceeds to Step S15 described below.

When it is determined that the access is not appropriate (the access destination is dangerous) ("Yes" in Step S7), the user inquirer 47 displays an inquiry message via the display 27 to the operator operating the multifunction peripheral 7 (Step S9). The inquiry message includes the message notifying the operator that the document data 3 includes the identification information on the network resource that is not appropriate for access and includes the message inquiring the operator as to whether the output of the document data 3 is to be canceled.

When the operation acceptor 29 accepts the input operation indicating that the output of the document data 3 is not to be canceled in response to the display of the inquiry message ("No" in Step S11), the process proceeds to Step S15 described below.

Conversely, when the operation acceptor 29 accepts the input operation indicating that the output of the document data 3 is to be canceled in response to the display of the inquiry message ("Yes" in Step S11), the outputter 49 cancels the output of the document data 3. The outputter 49 displays the message on the display 27 to notify the operator of the output cancellation (Step S13).

In the case of "No" in Steps S3, S5, S7, and S11, the outputter 49 outputs the document data 3 from the display 27 or the image former 33 as it is (Step S15).

1.4 Advantageous Effect

According to the present embodiment, when the document data input to the multifunction peripheral includes the identification information corresponding to the network resource that is not appropriate for access, the message is displayed to inform that fact and the message is displayed to inquire the operator as to whether the output of the document data is to be canceled, and the output of the document data is canceled so that the operator may be notified that the document data includes the identification information corresponding to the network resource that is not appropriate for access. Along with this, the message for printing cancellation is displayed so that the operator may be notified of that fact.

Also, according to the present embodiment, the multifunction peripheral cancels output of the document data to the display and/or print on the print medium. This may prevent Za person who has seen the displayed/printed document data from accessing the network resource that is not appropriate for access. Further, it is difficult to mechanically read the displayed/printed document data by a mobile terminal including a camera, such as a smartphone. This may prevent mobile terminals from accessing the network resource that is not appropriate for access through the displayed/printed document data.

2. Second Embodiment 2.1 Overall Configuration

Figure 5:
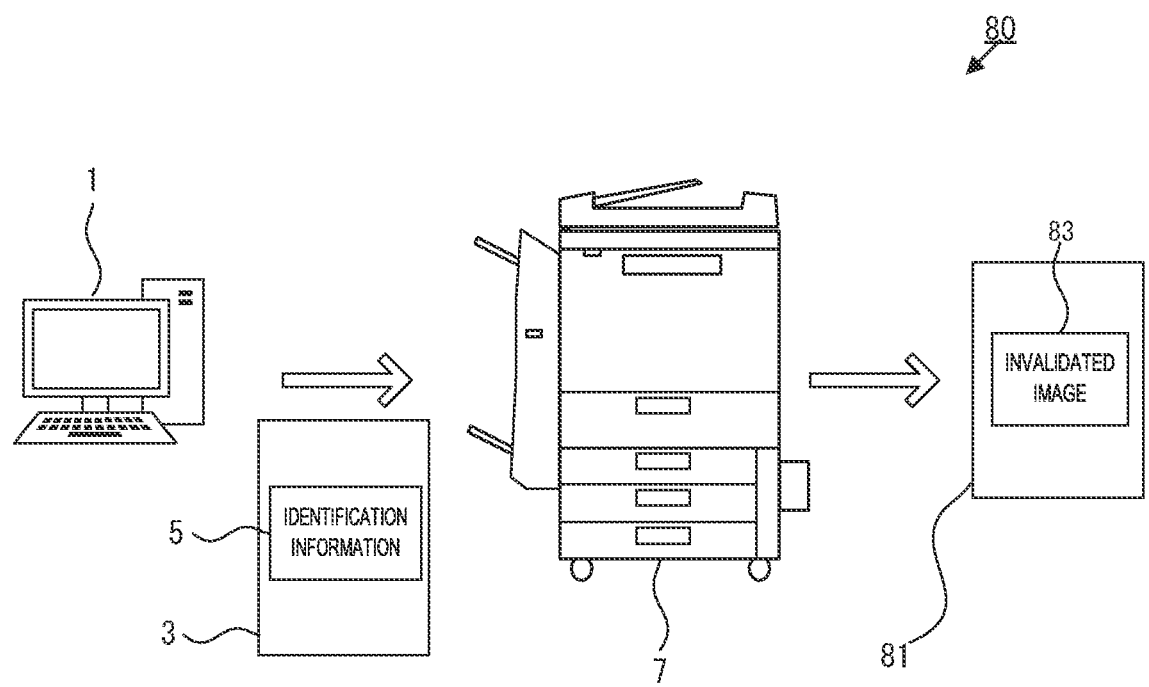
FIG. 5 is a diagram illustrating an entire system according to a second embodiment.

FIG. 5 is a diagram schematically illustrating a system 80 according to a second embodiment of the present disclosure. The system 80 includes the input terminal 1 and the multifunction peripheral 7. The details of the input terminal 1 and the multifunction peripheral 7 in the system 80 are the same as those in the system 70. According to the second embodiment, the multifunction peripheral 7 provides output 81 based on the document data 3. The output 81 is output printed on a print medium or displayed on a screen of a display device after changing at least part of the image corresponding to the identification information 5 in the document data 3 into an invalidated image 83.

2.2 Operation

Figure 6:
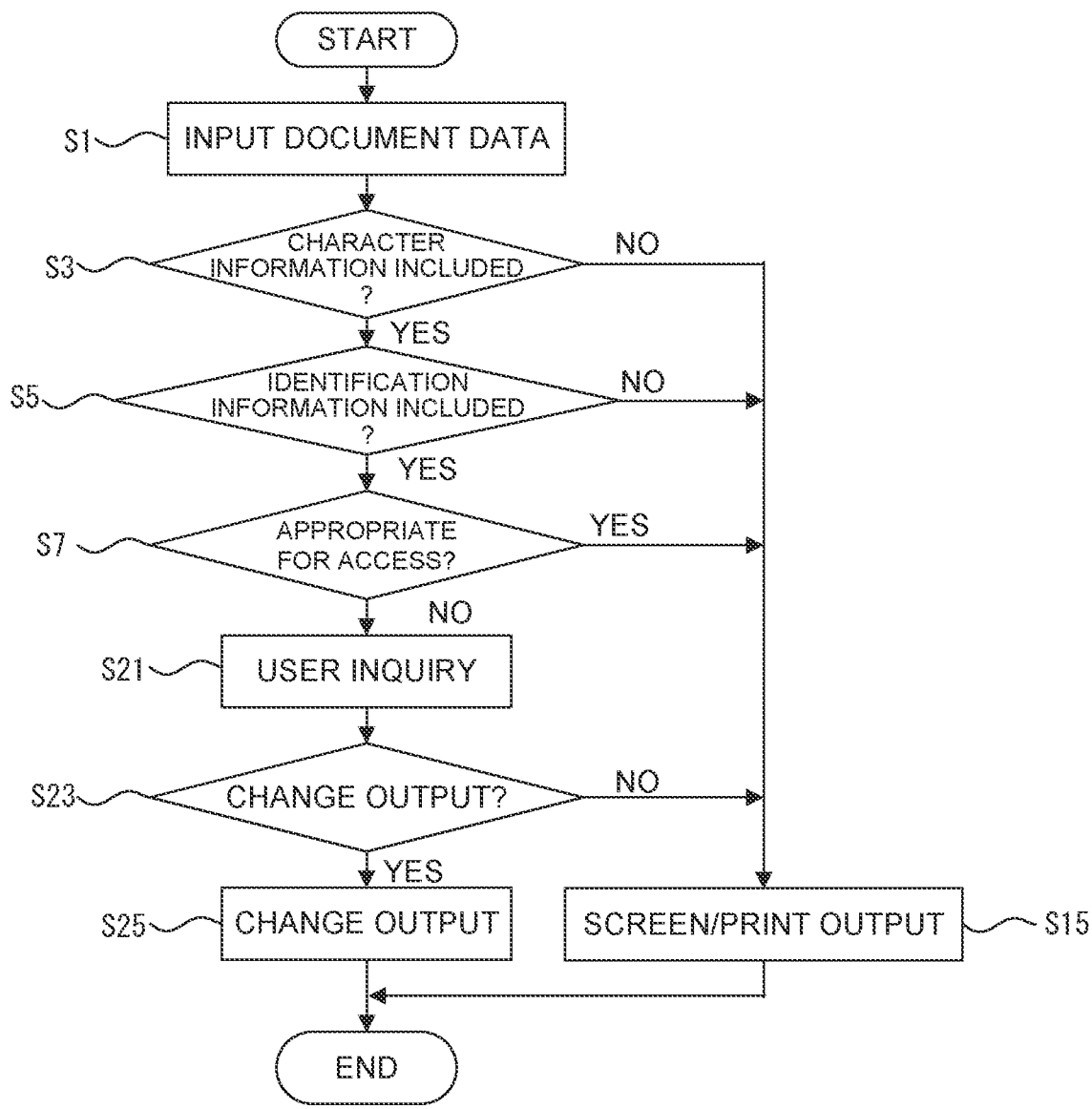
FIG. 6 is a diagram illustrating an operation of the multifunction peripheral according to the second embodiment.

FIG. 6 is a flowchart illustrating an operation of the multifunction peripheral 7 in the system 80. In Steps S1 to S7, the operation of the multifunction peripheral 7 in the system 80 is the same as that of the system 70 described above.

According to the present embodiment, when the network resource corresponding to the identification information is not appropriate for access, the user inquirer 47 displays an inquiry message by the display 27 (Step S21). The inquiry message includes the notification to the operator that the document data 3 includes the identification information on the network resource that is not appropriate for access. Further, the inquiry message includes the inquiry to the operator as to whether the identification information in the document data 3 is to be changed into an invalidated image.

When the operation acceptor 29 accepts the input operation indicating that the identification information in the document data 3 is not to be changed into an invalidated image in response to the display of the inquiry message ("No" in Step S23), the process proceeds to Step S15.

Conversely, it is assumed that the operation acceptor 29 has received the input operation indicating that the identification information in the document data 3 is to be changed into an invalidated image in response to the display of the inquiry message ("Yes" in Step S23). In this case, the outputter 49 changes at least part of the image corresponding to the identification information in the document data 3 into an invalidated image. The outputter 49 outputs the invalidated image from the display 27 or the image former 33 (Step S25).

When the invalidated image is output from the display 27, the outputter 49 displays the image of the document data 3 including the invalidated image on the screen of the display 27. When the invalidated image is output from the image former 33, the outputter 49 causes the image former 33 to form the image of the document data 3 including the invalidated image on a print medium and output the image as a printed material.

2.3 Invalidated Image

FIG. 7 illustrates examples of output images of the document data after at least part of the image corresponding to the identification information is changed into an invalidated image. It is assumed that the document data 63 illustrated in FIG. 4 is used as the document data.

Output images 91, 93, and 95 are obtained by changing part of a two-dimensional code into invalidated images. The output image 91 is obtained by covering the entire two-dimensional code of the document data 63 with shaded lines so that it is difficult to decode the output image 91 as a two-dimensional code. The color used for the shaded lines may be black or other colors. The number of colors used for the shaded lines is not limited to a single color but may be multiple colors. Instead of the shaded lines, fill patterns such as hatching or halftone dots may be used for covering. The output image 93 is obtained by drawing a cross on the same two-dimensional code in a superimposed manner. The output image 95 is obtained by drawing a white band with the word "Danger" written on the same two-dimensional code in a superimposed manner.

Part of the two-dimensional code is preferably changed into an invalidated image so as not to enable error correction by the error correction function of the two-dimensional code. For example, the error correction capability of typical QR codes is approximately 30 percent. Therefore, when the two-dimensional codes of the output images 91, 93, and 95 are QR codes, each of the invalidated images in the output images 91, 93, and 95 is preferably more than 30 percent of the entire two-dimensional code.

Output images 97, 101, and 103 are obtained by changing the entire two-dimensional codes into invalidated images. The output image 97 is obtained by filling the entire two-dimensional code of the document data 63 with black so that it is difficult to decode the output image 97 as a two-dimensional code. The color for filling may be other colors. The color used for filling may be a single color or multiple colors. The output image 101 is obtained by replacing the entire two-dimensional code with another image prepared as an invalidated image. The output image 101 has illustrations of a star, a circle, and a triangle, but any content may be drawn. The output image 103 is obtained by replacing the entire two-dimensional code with the image area including a text message notifying the reader that the dangerous identification information has been invalidated. In the output images 97, 101, and 103, the entire two-dimensional codes are replaced with the invalidated images, and therefore it is difficult for the error correction function to correct the invalidated images to restore the two-dimensional codes.

To print the document data in which the two-dimensional code has been changed into the invalidated image, the outputter 49 may further print the invalidated image on the two-dimensional code printed on a print medium to form the invalidated image on the print medium. Further, to print the document data in which the two-dimensional code has been changed into the invalidated image, the outputter 49 may synthesize the document data in which the two-dimensional code has been changed into the invalidated image and print the document data on the print medium based on the synthesized document data.

2.4 Advantageous Effect

According to the system 80, when the document data input to the multifunction peripheral includes the identification information corresponding to the network resource that is not appropriate for access, the displayed message includes the inquiry to the operator as to whether the identification information in the document data is to be changed into an invalidated image so that the operator may be notified that the input document data includes the identification information corresponding to the network resource that is not appropriate for access.

With the system 80, when the document data input to the multifunction peripheral includes the identification information corresponding to the network resource that is not appropriate for access, at least part of the identification information to be printed is changed into an invalidated image. This may prevent the operator of the multifunction peripheral or the person who has seen the printed material from accessing the network resource that is not appropriate for access through the printed material.

With the system 80, the entire identification information is changed into an invalidated image so as not to be mechanically read. This prevents a mobile terminal including a camera, such as a smartphone, from mechanically reading the identification information on the print medium or the screen. Thus, the system 80 may prevent mobile terminals from accessing the network resource that is not appropriate for access through the displayed/printed document data.

3. Third Embodiment 3.1 Overall Configuration

Figure 8:
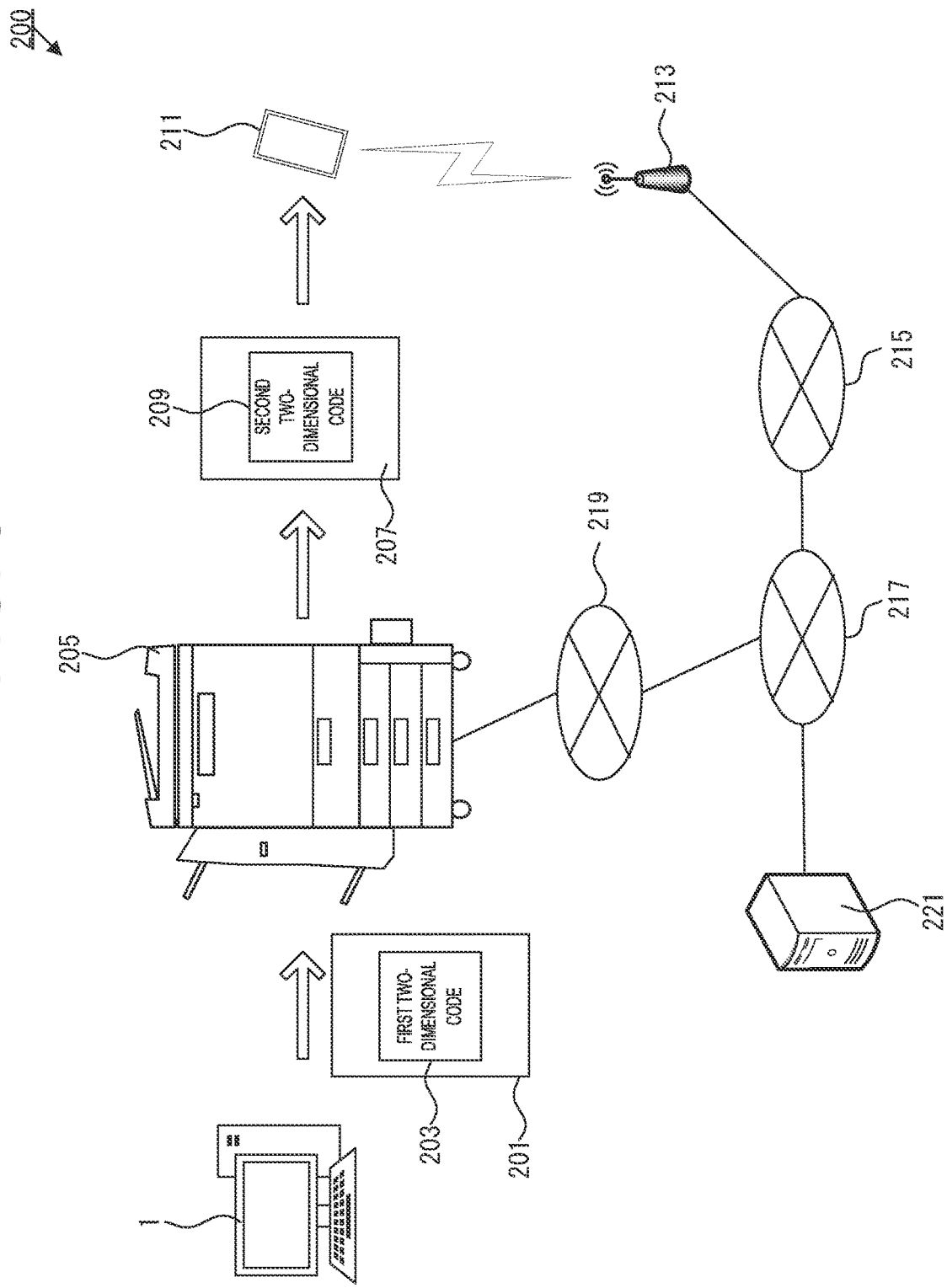
FIG. 8 is a diagram illustrating an entire system according to a third embodiment.

FIG. 8 is a diagram schematically illustrating a third embodiment of the present disclosure. A system 200 includes the input terminal 1, a multifunction peripheral 205, a mobile terminal 211, a base station 213, a mobile data communication network 215, Internet 217, a LAN 219, and a network resource 221.

The input terminal 1 is the same as that in the system 70 described above. The input terminal 1 and the multifunction peripheral 205 are configured such that document data 201 may be provided from the input terminal 1 to the multifunction peripheral 205 in some form. For example, when the input terminal 1 and the multifunction peripheral 205 are connected to the identical LAN, the document data 201 may be sent from the input terminal 1 to the multifunction peripheral 205 by data communication via the LAN. Alternatively, the input terminal 1 and the multifunction peripheral 205 may be connected via a USB cable, and the document data 201 may be sent directly from the input terminal 1 to the multifunction peripheral 205. Alternatively, the document data 201 may be stored in a removable external storage device such as a USB memory in the input terminal 1 and, after the external storage device is removed from the input terminal 1, the external storage device may be connected to the multifunction peripheral 205 so that the multifunction peripheral 205 may read the document data 201 from the external storage device.

The document data 201 is data that is output to a screen of a display device or a print medium for a printer. In the figure, the document data 201 is illustrated as printed on a print medium. The document data 201 includes a first two-dimensional code 203 as identification information. The first two-dimensional code 203 is obtained by encoding the information specifying the network resource 221 into a two-dimensional code. The type of two-dimensional codes may be a stack type, such as a Portable Data File (PDF) or a CODE, or a matrix type, such as QR code (registered trademark) or data matrix. The document data 201 and the first two-dimensional code 203 in the figure are schematically illustrated as displayed on a display device or printed on a print medium.

The multifunction peripheral 205 is one type of image processing apparatus and is a multifunction peripheral having multiple functions, i.e., copier function, facsimile function, printer function, and scanner function. Furthermore, the multifunction peripheral 205 preferably further has other functions, such as an Internet fax function to exchange information via e-mails.

The multifunction peripheral 205 has a web server function to publish web pages on the Internet 217 via the LAN 219. A second two-dimensional code 209 is obtained by encoding second identification information (e.g., a URL of a web page) indicating the web page published by the multifunction peripheral 205.

The multifunction peripheral 205 provides output 207 based on the document data 201. The output 207 is output printed on a print medium or displayed on a screen of a display device after replacing the first two-dimensional code 203 of the document data 201 with the second two-dimensional code 209.

The mobile terminal 211 is a mobile information terminal having a camera and a data communication function, e.g., a smartphone, cell phone terminal, tablet, or personal digital assistant or personal data assistant (PDA).

The base station 213 is a base station of the mobile data communication network 215 that accommodates the mobile terminal 211 as a mobile communication terminal.

The mobile data communication network 215 is a mobile communication network that accommodates the mobile terminal 211 as a mobile communication terminal. The communication standard of the mobile data communication network 215 is not particularly specified. The mobile data communication network 215 may also be, for example, Long Term Evolution (LTE), 4G, or 5G.

The Internet 217 connects the multifunction peripheral 205, the mobile data communication network 215, and the network resource 221 so as to enable data communication.

The LAN 219 is a local area network that accommodates the multifunction peripheral 205. The LAN 219 includes a gateway to connect to the Internet 217.

The network resource 221 is a server on the Internet 217 or various types of data published by the server. The network resource 221 is accessible from the mobile terminal 211 via the base station 213, the mobile data communication network 215, and the Internet 217. As described above, the network resource 221 is indicated by first identification information obtained by decoding the first two-dimensional code 203.

3.2 Configuration of Multifunction Peripheral 205

Figure 9:
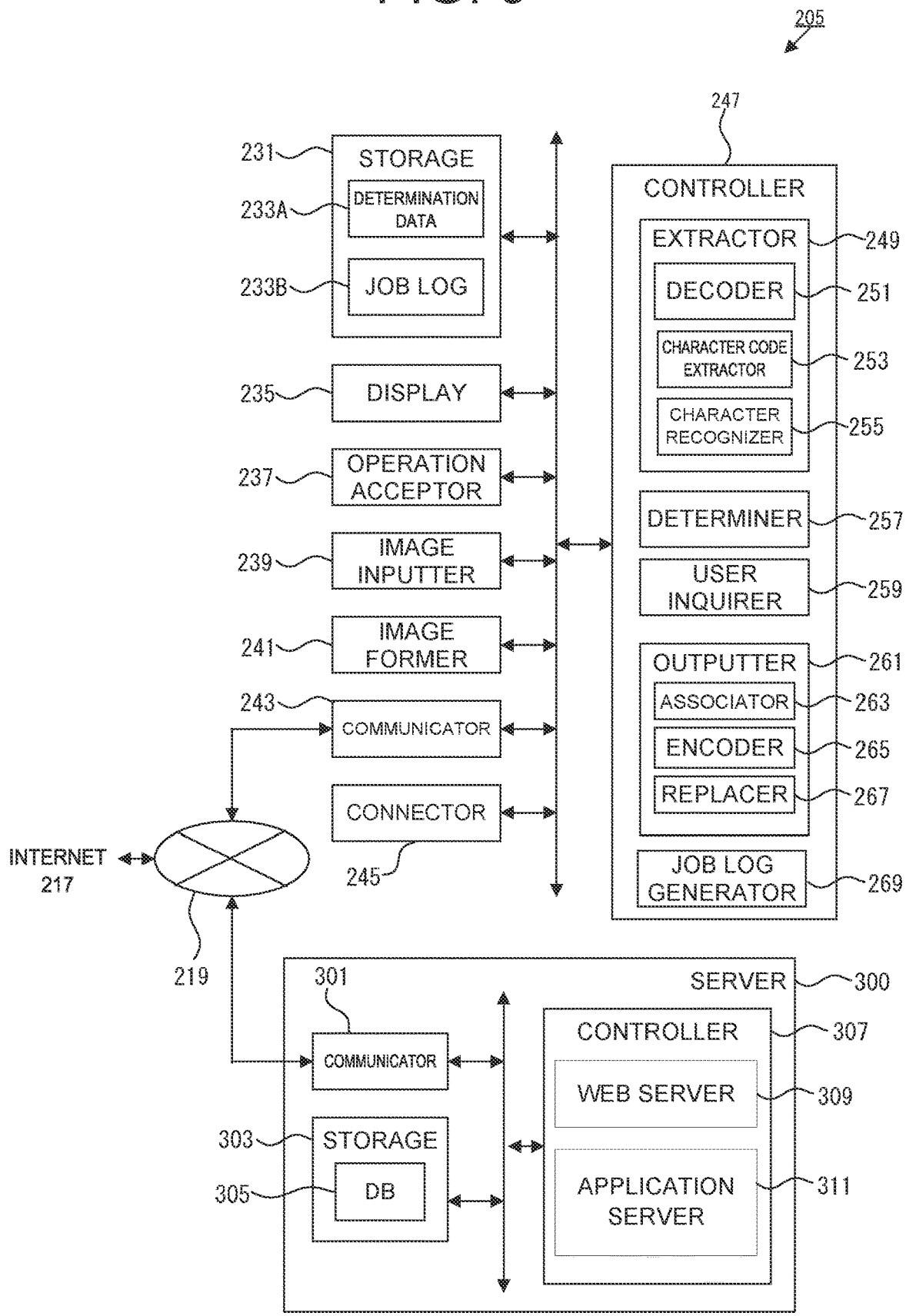
FIG. 9 is a diagram illustrating a functional configuration of a multifunction peripheral according to the third embodiment.

FIG. 9 is a diagram illustrating an example of a functional configuration of the multifunction peripheral 205. The multifunction peripheral 205 includes a storage 231, a display 235, an operation acceptor 237, an image inputter 239, an image former 241, a communicator 243, a connector 245, a controller 247, and a server 300.

The storage 231 is a functional unit that stores various programs and various types of data necessary for operations of the multifunction peripheral 205. The storage 231 includes a recording device capable of transitory storage, such as a DRAM, or a non-transitory recording device, such as an SSD including a semiconductor memory or an HDD including a magnetic disc. Although the one storage 231 is used for convenience of explanation, the storage 231 may be configured as separate devices for purposes, such as an area (primary storage area) used for program execution, an area (auxiliary storage area) for storing programs and data, and an area used for caching. Further, the storage 231 stores determination data 233A and a job log 233B.

The determination data 233A is the data used by the determiner 257 to determine whether the network resource corresponding to the identification information is appropriate for access. The job log 233B is data generated by a job log generator 269 based on a result of the operation of the multifunction peripheral 205, and the server 300 generates and publishes a website based on the job log 233B.

The configurations of the display 235, the operation acceptor 237, the image inputter 239, and the image former 241 are the same as those of the display 27, the operation acceptor 29, the image inputter 31, and the image former 33, respectively, included in the multifunction peripheral 7 according to the first embodiment, and therefore their descriptions are omitted.

The communicator 243 includes a network card and is connected to the LAN 219 to communicate data. The communicator 243 communicates data with the server 300 via the LAN 219 and sends the job log 233B to the server 300.

The connector 245 connects the multifunction peripheral 205 so as to communicate data with other devices. For example, the connector 245 is a USB interface, to which a USB memory, or the like, is connected. In addition, the connector 245 may also have short-range wireless functions, such as NFC and Bluetooth. The communicator 243 and the connector 245 may be configured as a single unit. For example, the communicator 243 and the connector 245 may be provided as a single wireless communication interface that may use wireless LAN or Bluetooth.

The controller 247 is a functional unit that controls the overall multifunction peripheral 205. The controller 247 includes one or more control devices or control circuitries and includes, for example, a CPU or SoC. The controller 247 reads programs stored in the storage 231 and performs processes to function as an extractor 249, a determiner 257, a user inquirer 259, an outputter 261, and the job log generator 269.

The server 300 is a server device that performs a function as a web server. The server 300 includes a communicator 301, a storage 303, and a controller 307. According to the present embodiment, the server 300 is configured as part of the multifunction peripheral 205, but may be a device independent of the multifunction peripheral 205. When the server 300 is configured as part of the multifunction peripheral 205, the controller 247, the storage 231, and the communicator 243 perform the functions of the controller 307, the storage 303, and the communicator 301, respectively, so that the server 300 may be omitted. In this case, the controller 247 further includes a web server 309 and an application server 311. The storage 231 further stores a database (DB) 305.

The communicator 301 is a functional unit that is connected to the LAN 219 to communicate data in the same manner as the communicator 243. The communicator 301 communicates data with the communicator 243 via the LAN 219 and, in particular, receives the job log 233B from the communicator 243.

The communicator 301 communicates data with the network resource 221 via the LAN 219 and the Internet 217 and, in particular, sends data to the mobile terminal 211 to publish a web page in response to a request from the mobile terminal 211.

The storage 303 is a functional unit that stores various programs and various types of data necessary for operations of the server 300. The storage 303 includes a recording device capable of transitory storage, such as a DRAM, or a non-transitory recording device, such as an SSD including a semiconductor memory or an HDD including a magnetic disc. Although the one storage 303 is used for convenience of explanation, the storage 303 may be configured as separate devices for purposes, such as an area (primary storage area) used for program execution, an area (auxiliary storage area) for storing programs and data, and an area used for caching.

The storage 303 stores the DB 305. The DB 305 stores data based on the job log 233B that is received by the communicator 301 from the communicator 243.

The controller 307 is a functional unit that controls the server 300. The controller 307 includes one or more control devices or control circuitries and includes, for example, a CPU or SoC. The controller 307 reads programs stored in the storage 303 and executes processes to function as the web server 309 and the application server 311.

The web server 309 sends data to a web browser to compose a web page in response to a request from the web browser. The application server 311 executes a programming language in response to a request from the web server 309 and returns an execution result to the web server 309.

3.3 Configuration of Mobile Terminal 211

Figure 10:
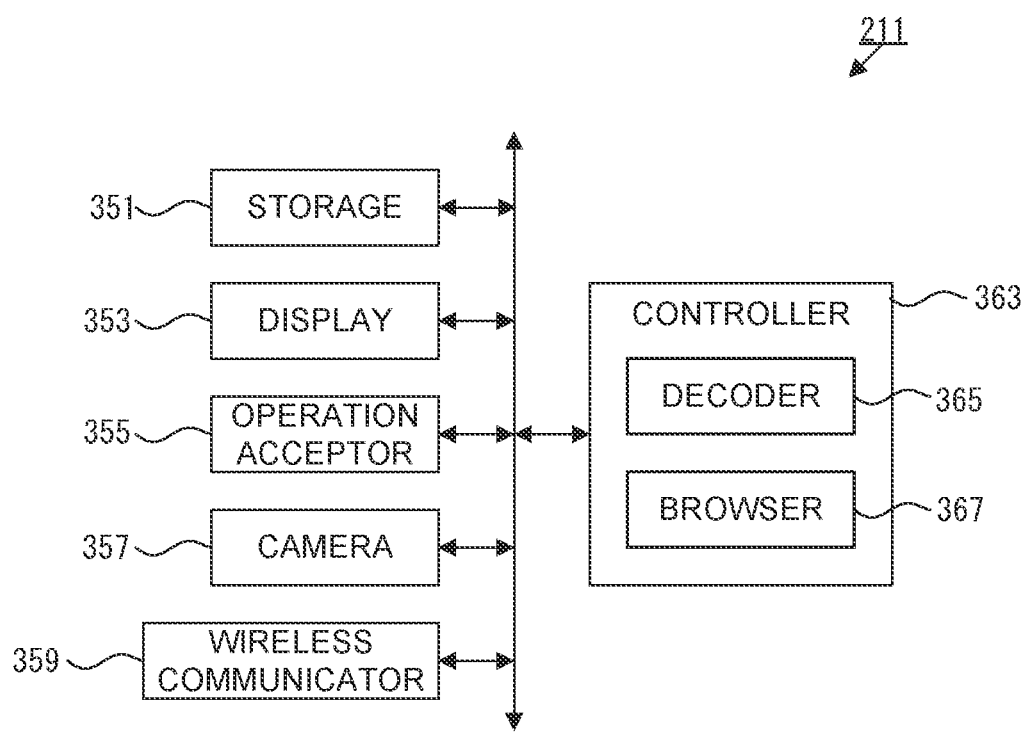
FIG. 10 is a diagram illustrating a functional configuration of a mobile terminal according to the third embodiment.

FIG. 10 is a diagram illustrating an example of a functional configuration of the mobile terminal 211. The mobile terminal 211 includes a storage 351, a display 353, an operation acceptor 355, a camera 357, a wireless communicator 359, and a controller 363.

The storage 351 is a functional unit that stores various programs and various types of data necessary for operations of the mobile terminal 211. The storage 351 includes a recording device capable of transitory storage, such as a DRAM, or a non-transitory recording device, such as an SSD including a semiconductor memory or an HDD including a magnetic disc. Although the one storage 351 is used for convenience of explanation, the storage 351 may be configured as separate devices for purposes, such as an area (primary storage area) used for program execution, an area (auxiliary storage area) for storing programs and data, and an area used for caching.

The display 353 is a functional unit that displays images and characters. The display 353 includes, for example, a liquid crystal display (LCD) or an organic EL panel.

The operation acceptor 355 is a user interface device that accepts operations by a person operating the mobile terminal 211 and is an input device such as a push button, numeric keypad, or touch panel. The display 353 and the operation acceptor 355 may be provided as a single touch panel display.

The camera 357 is a camera including a solid-state image sensor such as a charge-coupled device (CCD) image sensor or complementary metal-oxide semiconductor (CMOS) image sensor.

The wireless communicator 359 includes a radio antenna, a radio transmitter/receiver, and a baseband processing device so that radio signals received by the radio antenna and sent to the radio transmitter/receiver are digitally processed in the baseband processing device.

The controller 363 is a functional unit that controls the mobile terminal 211. The controller 363 includes one or more control devices or control circuitries and includes, for example, a CPU or a SoC. The controller 363 reads programs stored in the storage 351 and performs processes to function as a decoder 365 and a browser 367.

The decoder 365 is a decoder that decodes the second two-dimensional code 209 printed or displayed as the output 207. The browser 367 receives the data forming a web page by the wireless communicator 359 and displays the web page by the display 353.

3.4 Operation of Multifunction Peripheral 205

Figure 11:
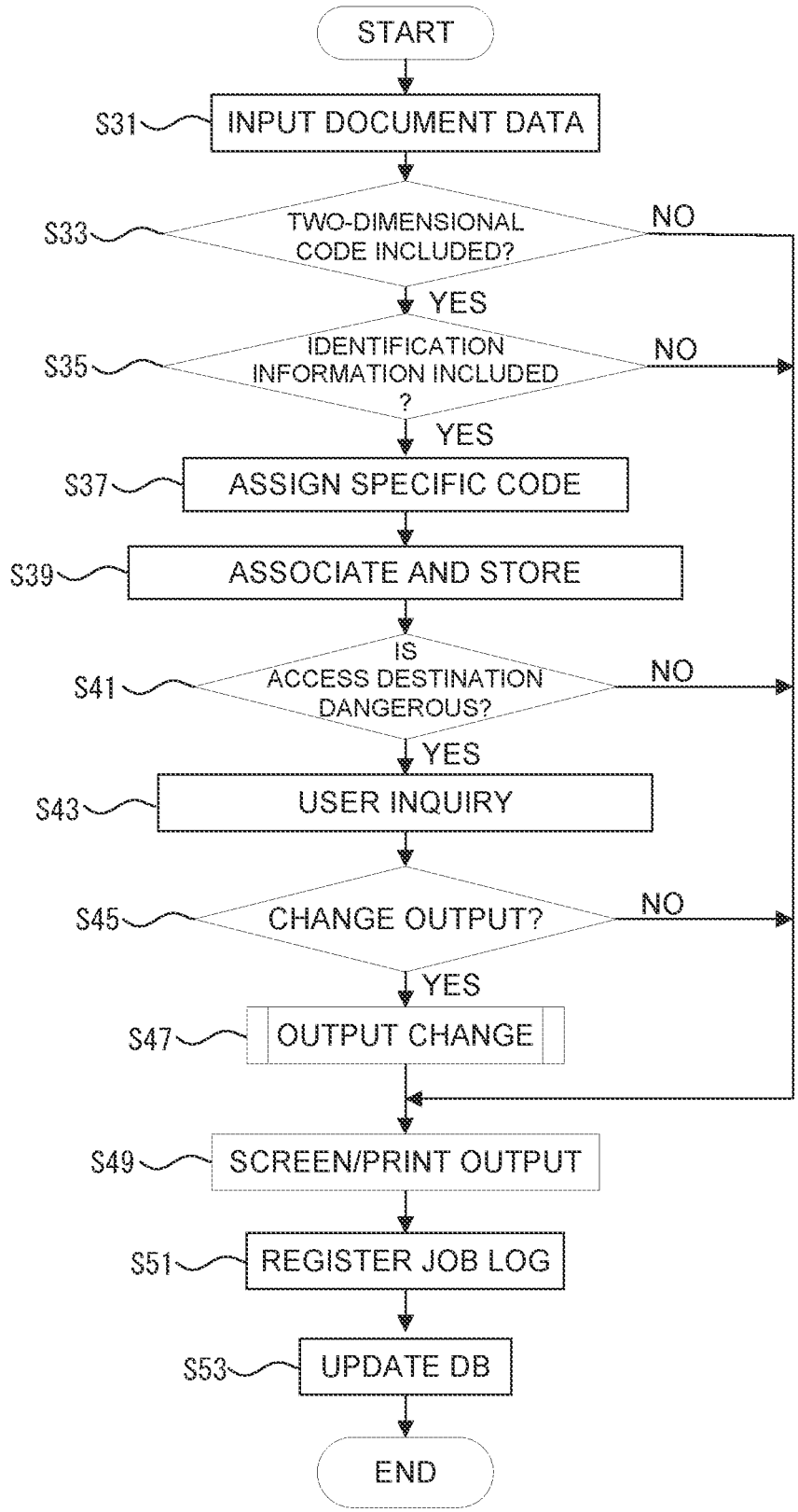
FIG. 11 is a diagram illustrating an operation of the multifunction peripheral according to the third embodiment.

FIG. 11 is a flowchart illustrating an operation of the multifunction peripheral 205. The multifunction peripheral 205 inputs the document data 201 sent from the input terminal 1 (Step S31). The document data 201 includes the first two-dimensional code 203 corresponding to the network resource 221. When the document data 201 is printed as it is, for example, the document data 63 or 65 in FIG. 4 is obtained as a printed image as it is. The first two-dimensional code 203 is obtained by encoding the URL of the network resource 221 into a two-dimensional code.

When the communicator 243 receives the document data 201, the extractor 249 attempts to extract a two-dimensional code from the document data 201 (Step S33). The extractor 249 generates a virtual print image from the document data 201 and attempts to detect a two-dimensional code from the print image. When a two-dimensional code is detected, a decoder 251 decodes the two-dimensional code and outputs a character code. The character information including the character code output by the decoder 251 is hereinafter referred to as decode character information. When no two-dimensional code is extracted from the document data 201 ("No" in Step S33), the process proceeds to Step S49 described below.

When a two-dimensional code is extracted from the document data 201 ("Yes" in Step S33), the extractor 249 extracts the decode character information as identification information (Step S35). The method for extracting the identification information is the same as that in Step S5 of FIG. 3. When the identification information is included, the extractor 249 outputs the identification information as the first identification information. At that time, the extractor 249 assigns a specific code to the extracted first identification information to identify the pieces of first identification information with each other and stores the first identification information and the specific code in association with each other in the job log 233B (Steps S37 and S39). When the decode character information does not include the identification information ("No" in Step S35), the process proceeds to Step S49 described below.

When the extractor 249 extracts the first identification information, the determiner 257 makes a determination as to whether the network resource indicated by the first identification information is appropriate for access (whether the access destination is dangerous) based on the determination data 233A (Step S41). The method for making a determination as to whether the access is appropriate is the same as that in Step S7 of FIG. 3. When it is determined that the access is appropriate (the access destination is not dangerous) ("No" in Step S41), the process proceeds to Step S49 described below.

When the determiner 257 determines that the access is not appropriate (the access destination is dangerous) ("Yes" in Step S41), the user inquirer 259 displays an inquiry message via the display 235 to the operator operating the multifunction peripheral 205 (Step S43). The inquiry message includes the message notifying the operator that the document data 201 includes the two-dimensional code including the identification information on the network resource that is not appropriate for access. The inquiry message also includes the message inquiring the operator as to whether the first two-dimensional code included in the document data 201 is to be invalidated.

When the operation acceptor 237 accepts the input operation indicating that the first two-dimensional code of the document data 201 is not to be invalidated in response to the display of the inquiry message ("No" in Step S45), the process proceeds to Step S49 described below.

When the operation acceptor 237 accepts the input operation indicating that the first two-dimensional code of the document data 201 is to be invalidated in response to the display of the inquiry message ("Yes" in Step S45), the outputter 261 performs an output change process described below (Step S47).

FIG. 12 is a flowchart illustrating the output change process. An associator 263 generates the second identification information based on the specific code assigned to the first identification information in Step S37 and the URL of the website published on the Internet 217 by the server 300 (Step S61).

For example, it is assumed that, on the Internet 217, the server 300 publishes the website whose URL is www.multifunctionprinter.com. Further, it is assumed that the first two-dimensional code included in the document data 201 includes www.hacked-server.com as the first identification information. Moreover, it is assumed that, in Step S37, 0005 is assigned as the specific code to the first identification information. Here, the associator 263 generates www.multifunctionprinter.com/0005 as the second identification information based on the URL of the website and the specific code.

The associator 263 associates the generated second identification information with the corresponding first identification information and the specific code (Step S63). Subsequently, an encoder 265 encodes the second identification information to generate a second two-dimensional code (Step S65). The encoding method used to encode the first two-dimensional code and the encoding method used to encode the second two-dimensional code may be the same or different.

Subsequently, a replacer 267 generates output data in which the portion of the document data 201 corresponding to the first two-dimensional code is replaced with the second two-dimensional code (Step S67).

Returning to FIG. 11, in the case of "No" in any of Steps S33, S35, S41, and S45, the outputter 261 generates an image or print image using the document data 201 as it is and outputs the image or print image from the display 235 or the image former 241. Conversely, in the case of "Yes" in all of Steps S33, S35, S41, and S45, the outputter 261 outputs the output data generated in Step S67 from the display 235 or the image former 241 (Step S49).

Subsequently, the job log generator 269 generates a log of the series of operations described above and stores the log as the job log 233B (Step S51). In particular, the job log generator 269 stores the specific code, the first identification information, and the second identification information in association with each other in the job log 233B. FIG. 13 illustrates an example of the job log 233B that stores the specific code, the first identification information, and the second identification information in association with each other. The job log 233B in FIG. 13 stores five sets in total of the first identification information that is determined to be dangerous in the multifunction peripheral 205, and the specific code and the second identification information associated with the first identification information.

Subsequently, the job log generator 269 sends the data of the job log 233B to the server 300 via the communicator 243 and the LAN 219. When the communicator 301 receives the data, the server 300 updates the DB 305 based on the data to synchronize the data contents in the job log 233B and the DB 305 (Step S53). Therefore, basically the job log 233B and the DB 305 store the same contents for the specific code, the first identification information, and the second identification information.

3.5 Operations of Server 300 and Mobile Terminal 211

Figure 15:
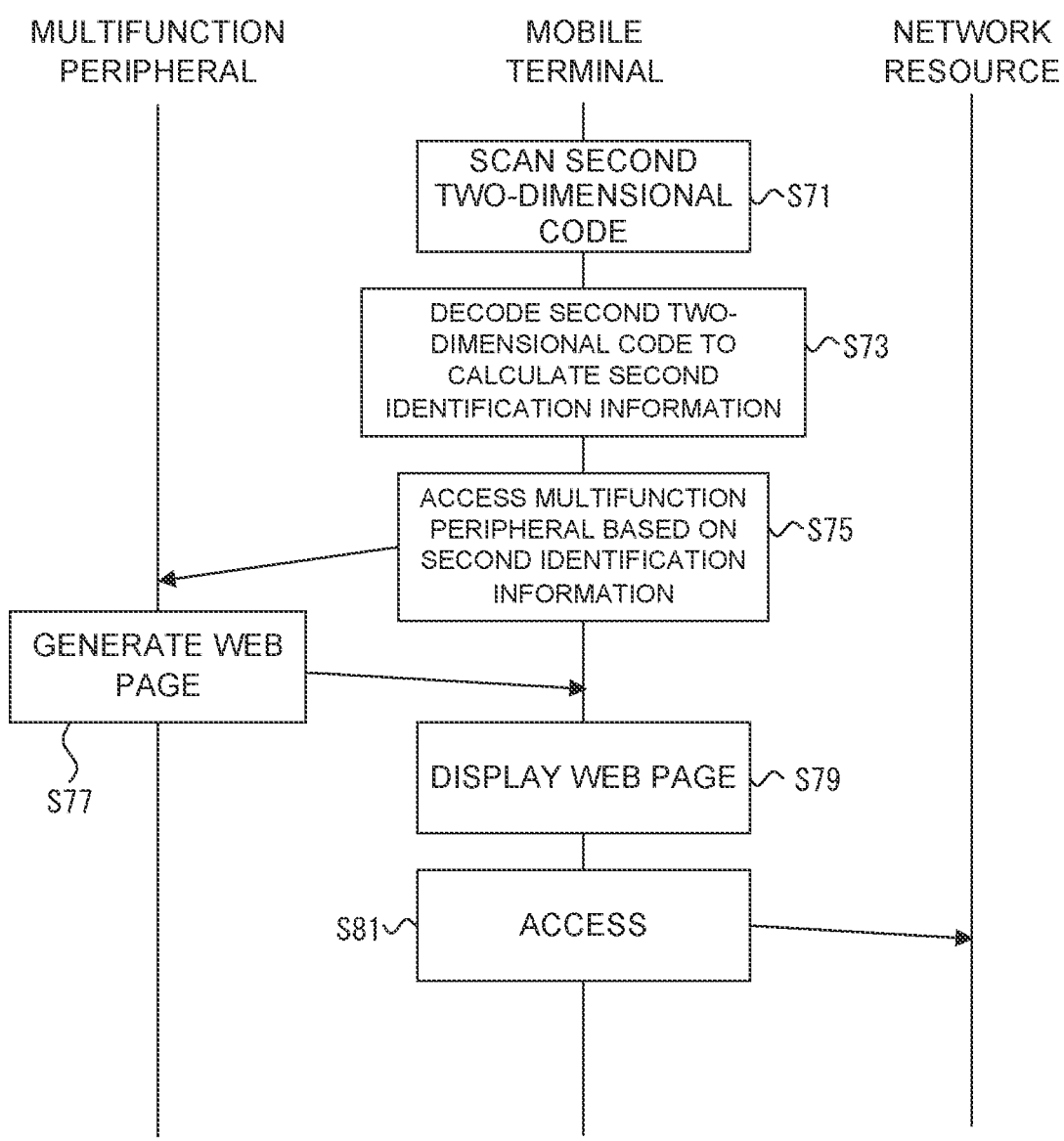
FIG. 15 is a diagram illustrating an operation of the multifunction peripheral and the mobile terminal according to the third embodiment.

FIG. 15 is a diagram illustrating the operations of the server 300 and the mobile terminal 211. It is assumed that, currently, the user of the mobile terminal 211 has in hand the printed material of the output data generated by replacing the portion of the document data 201 corresponding to the first two-dimensional code with the second two-dimensional code in Step S67 of FIG. 12.

When the user causes the camera 357 of the mobile terminal 211 to mechanically read the second two-dimensional code printed on the printed material (Step S71), the decoder 365 decodes the second two-dimensional code to acquire the second identification information (Step S73).

As described in Step S61, the second identification information is generated based on the specific code assigned to the first identification information in Step S37 of FIG. 11 and the URL of the website published on the Internet 217 by the server 300. In the example described below, www.multifunctionprinter.com/0005 is calculated as the second identification information associated with the specific code 0005 in FIG. 13.

When receiving the second identification information from the decoder 365, the browser 367 uses the wireless communicator 359 to request the data forming the web page from the server 300 of the multifunction peripheral 205 via the base station 213, the mobile data communication network 215, the Internet 217, and the LAN 219 (Step S75). Here, the web page designated by www.multifunctionprinter.com/0005 is requested.

When receiving the request from the mobile terminal 211, the web server 309 requests the application server 311 to generate the web page indicated by the second identification information (Step S77). Here, the web server 309 requests the generation of the web page designated by www.multifunctionprinter.com/0005.

When receiving the request from the web server 309, the application server 311 refers to the DB 305 to acquire the first identification information corresponding to the second identification information. The application server 311 generates a HyperText Markup Language (HTML) document forming the web page that has the acquired first identification information as a link destination. The generated web page includes the message inquiring the user of the mobile terminal 211 as to whether the access to the network resource 221 indicated by the first identification information corresponding to the second identification information is desired.

Figure 14:
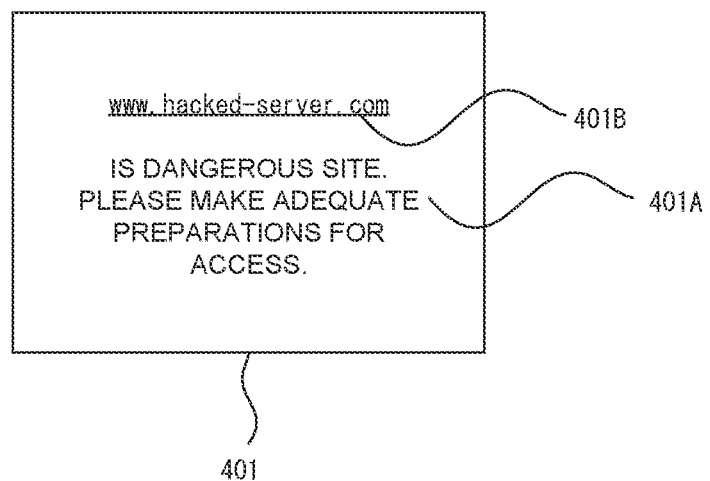
FIG. 14 is a diagram illustrating an example of a web page published by the multifunction peripheral according to the third embodiment.

The web page generated by the application server 311 includes the first identification information corresponding to the second identification information. FIG. 14 illustrates an example of the web page generated by the application server 311. A web page 401 includes a message 401A and a link 401B. The message 401A is a message warning the mobile terminal 211 that the link destination (the first identification information) requested by the mobile terminal 211 is dangerous. The link 401B is a link that leads the viewer to the network resource 221. On the web page 401, the first identification information itself is displayed as the link 401B. Thus, the viewer of the web page 401 may know the first identification information (www.hacked-server.com).

When receiving the HTML document forming the web page 401 from the application server 311, the web server 309 sends the page data including the HTML document to the mobile terminal 211. The page data includes other data (e.g., image data) forming the web page in addition to the HTML document. The web server 309 uses the communicator 301 to send the page data to the mobile terminal 211 via the LAN 219, the Internet 217, and the mobile data communication network 215.

When receiving the page data by the wireless communicator 359, the browser 367 displays the web page on the display 353 based on the page data (Step S79). For example, the browser 367 displays the web page, such as the web page 401 in FIG. 14, on the display 353.

The display 353 displays the message 401A as part of the web page 401. This allows the user of the mobile terminal 211 to receive a warning that the link destination (the first identification information) is dangerous.

The display 353 illustrates the link 401B as part of the web page 401. By displaying the link 401B, the mobile terminal 211 may provide the user with a way of accessing the network resource 221 indicated by the first identification information, which is originally written in the document data 201.

When the user of the mobile terminal 211 performs an operation to select the link 401B via the operation acceptor 355, the browser 367 uses the wireless communicator 359 to access the network resource 221 via the base station 213, the mobile data communication network 215, the Internet 217, and the LAN 219 (Step S81).

3.6 Advantageous Effect

According to the present embodiment, when the document data 201 includes the first two-dimensional code 203 indicating the first identification information of the network resource 221 and the network resource 221 is dangerous, the multifunction peripheral 205 changes the document data 201 to be output. Specifically, the multifunction peripheral 205 provides the output 207 in which the first two-dimensional code 203 is replaced with the second two-dimensional code 209. The second two-dimensional code 209 corresponds to the second identification information indicating the web page in the website operated by the multifunction peripheral 205. When the mobile terminal 211 mechanically reads the second two-dimensional code 209 on the output 207, the mobile terminal 211 is led to the web page in the website operated by the multifunction peripheral 205. Thus, according to the present embodiment, it is possible to prevent the mobile terminal 211 from mechanically reading the document data output by the multifunction peripheral 205 to be directly led to the dangerous network resource.

According to the present embodiment, the mobile terminal 211 is led to the web page 401 instead of the network resource 221. The web page 401 displays the message warning that the network resource 221 is dangerous. The web page 401 displays the link to the network resource 221. Thus, according to the present embodiment, it is possible to provide the way of accessing the network resource 221 if necessary while warning the user of the mobile terminal 211 that the network resource 221 is dangerous.

3.7 Modification

A modification of the third embodiment will be described. The hardware configuration is the same as that of the system 200, the multifunction peripheral 205, and the mobile terminal 211 described above. Compared with the third embodiment described above, the operations of the multifunction peripheral 205 and the mobile terminal 211 are different according to the present modification. In particular, the present modification is different in that the multifunction peripheral 205 sends a web page 403 instead of the web page 401 to the mobile terminal 211. In particular, the web page 403 is different from the web page 401 in that the first identifying information is not included.

Figure 16:
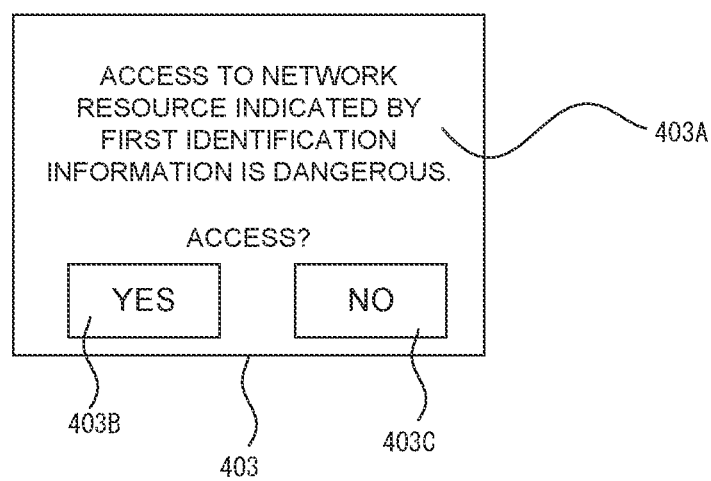
FIG. 16 is a diagram illustrating an example of a web page published by a multifunction peripheral according to a modification of the third embodiment.

FIG. 16 illustrates the web page 403 generated by the application server 311. The web page 403 includes a message 403A and buttons 403B and 403C. The message 403A is a message warning the viewer of the web page that the first identification information is dangerous.

The buttons 403B and 403C are provided to inquire the viewer of the web page as to whether the access to the network resource 221 is desired. The button 403B displays the message "Yes" and the button 403C displays the message "No". The buttons 403B and 403C are links having the web pages indicated by third identification information and fourth identification information, respectively, as destinations.

The web pages indicated by the third identification information and the fourth identification information are web pages in the website managed by the web server 309. The third identification information and the fourth identification information are preferably defined in association with the second identification information. For example, when the web page 403 is a web page published in www.multifunctionprinter.com/0005, the application server 311 determines that the character string obtained by adding "/yes" to the character string forming the second identification information, i.e., www.multifunctionprinter.com/0005/yes, is the third identification information. Here, the application server 311 determines that the character string obtained by adding "/no" to the character string forming the second identification information, i.e., www.multifunctionprinter.com/0005/no, is the fourth identification information.

FIG. 17 is a diagram illustrating an operation according to the present modification. Steps S71, S73, and S75 are the same as those according to the third embodiment. The present modification is different from the third embodiment after Step S77.

In Step S75, the multifunction peripheral 205 receives the access request from the mobile terminal 211 to the web page indicated by the second identification information. Here, in the multifunction peripheral 205, the communicator 301 receives the access request from the Internet 217 and passes the access request to the web server 309. The web server 309 requests the application server 311 to generate the web page indicated by the second identification information.

When receiving the request from the web server 309, the application server 311 refers to the DB 305 to acquire the first identification information corresponding to the second identification information. The application server 311 generates the HTML document forming the web page 403 (Step S91) and passes the HTML document to the web server 309. In response to the access request, the web server 309 uses the communicator 301 to send the page data to the mobile terminal 211. The page data is the data forming the web page 403 including the HTML document generated by the application server 311. In addition to the HTML document, the page data may include images, audio, video, and the like. In the mobile terminal 211, the wireless communicator 359 receives the page data and passes the page data to the browser 367. The browser 367 uses the display 353 to display the web page 403 (Step S93).

When the user of the mobile terminal 211 performs an operation to select the button 403B displaying the message "Yes" in the operation acceptor 355, the browser 367 uses the wireless communicator 359 to send the access request to the multifunction peripheral 205 (Step S95). This access request requests access to the web page indicated by the third identification information (e.g., www.multifunctionprinter.com/0005/yes).

In the multifunction peripheral 205, when the communicator 301 receives the access request, the web server 309 refers to the DB 305 to acquire the first identification information corresponding to the third identification information designated by the access request. The web server 309 uses the communicator 301 to send, to the mobile terminal 211, the redirection having the network resource 221 indicated by the acquired first identification information as a destination (Step S97).

In the mobile terminal 211, when the wireless communicator 359 receives the redirection and passes the redirection to the web server 309, the web server 309 accesses the network resource 221 in accordance with the redirection (Step S99).

According to the present modification, as the web page 403 does not include the first identification information, it is possible to lead the mobile terminal 211 to the network resource 221 as needed while the first identification information is hidden from the user of the mobile terminal 211.

4. Others

The present disclosure is not limited to the above-described embodiments and modification, and various changes are possible. That is, the technical scope of the present disclosure also includes an embodiment obtained by combining technical measures modified as appropriate without departing from the scope of the present disclosure.

Furthermore, although some parts of the above embodiments have been described separately for convenience of explanation, it is needless to say that the embodiments may be combined and implemented within a technically possible range. For example, the first embodiment and the second embodiment may be combined so that, when it is determined that the network resource indicated by the identification information is dangerous, the operator of the multifunction peripheral may be inquired as to whether the output is to be canceled as in the first embodiment or the output is to be changed as in the second embodiment.

The program operated on each of the devices according to the embodiment is a program that controls the CPU or the like (a program that causes the computer to function) so as to implement the functions according to the above-described embodiment. The information handled by the devices is temporarily accumulated in a temporary storage device (for example, RAM) during processing of the information, and then, is stored in various storage devices such as a read-only memory (ROM) and an HDD, and is read, modified, and written by the CPU as necessary.

Here, a recording medium that stores the program may be, for example, any of a semiconductor medium (for example, ROM and a non-volatile memory card), an optical recording medium/magneto-optical recording medium (for example, a digital versatile disc (DVD), a magneto optical disc (MO), a Mini Disc (MD), a compact disc (CD), and a Blu-ray (registered trademark) Disc (BD)), and a magnetic recording medium (for example, a magnetic tape and a flexible disk). The functions according to the above embodiments may be implemented by executing the loaded programs, and also the functions according to the present disclosure may be implemented by processing in cooperation with the operating system, other application programs, or the like, in accordance with the instructions of the programs.

Furthermore, for distribution to the market, the program may be stored in a portable recording medium for distribution or transferred to a server computer connected via a network such as the Internet. In this case, a storage device of the server computer is also included in the present disclosure as a matter of course.

What is claimed is:

1. An image processing apparatus comprising one or more controllers and an output device, the one or more controllers configured to:
   extract identification information corresponding to a network resource from input document data;
   make a determination as to whether access to the network resource is appropriate based on the identification information; and
   based on a result of the determination, invalidate the identification information when the access to the network based on the identification information is determined to be inappropriate, and output the document data via the output device.

2. The image processing apparatus according to claim 1, wherein the one or more controllers are further configured to prohibit the output of the document data including the identification information.

3. The image processing apparatus according to claim 1, wherein the one or more controllers are further configured to superimpose an image on at least part of a portion corresponding to the identification informational for output to invalidate the identification information.

4. The image processing apparatus according to claim 1, wherein the one or more controllers are further configured to replace at least part of a portion corresponding to the identification information with an image to invalidate the identification information.

5. The image processing apparatus according to claim 1, wherein
   the identification information is first identification information, the one or more controllers further configured to:
   further extract second identification information from the input document data; and
   make a determination as to whether the access to the network resource is appropriate based on a result of matching the first identification information with the second identification information.

6. The image processing apparatus according to claim 1, wherein the one or more controllers are further configured to decode a two-dimensional code.

7. The image processing apparatus according to claim 6, wherein the two-dimensional code is a first two-dimensional code, the network resource is a first network resource, and the identification information is first identification information, the one or more controllers further configured to:
- associate the first identification information corresponding to the first network resource, obtained by decoding the first two-dimensional code included in the document data with second identification information corresponding to a second network resource that is different from the first network resource;
- encode the second identification information to generate a second two-dimensional code; and
- replace the first two-dimensional code with the second two-dimensional code.

8. The image processing apparatus according to claim 7, further comprising a server that publishes the second network resource on a network.

9. An image processing method comprising:
- extracting identification information corresponding to a network resource from input document data;
- making a determination as to whether access to the network resource is appropriate based on the identification information;
- based on a result of the determination, invalidating the identification information when access to the network based on the identification information is determined to be inappropriate; and
- outputting the document data.

\* \* \* \* \*